Aug. 20, 1929.  T. MADSEN  1,725,660
PACKING RING FOR USE WITH PISTONS AND PISTON RODS
Filed Jan. 28, 1928
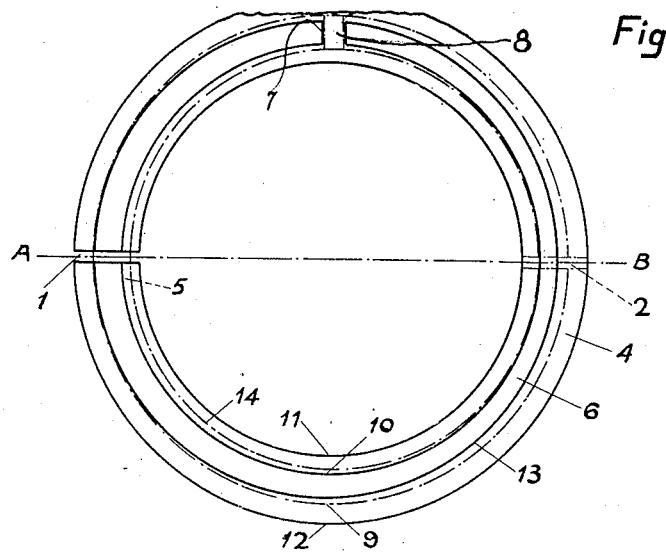
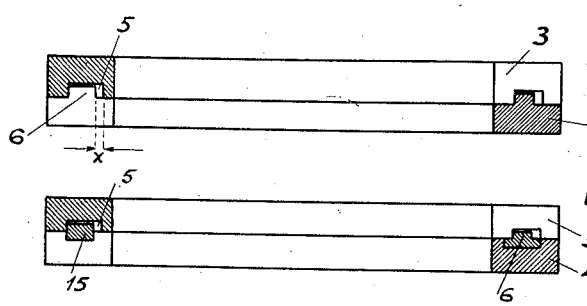
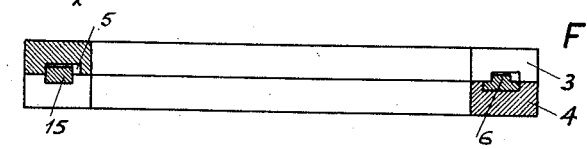
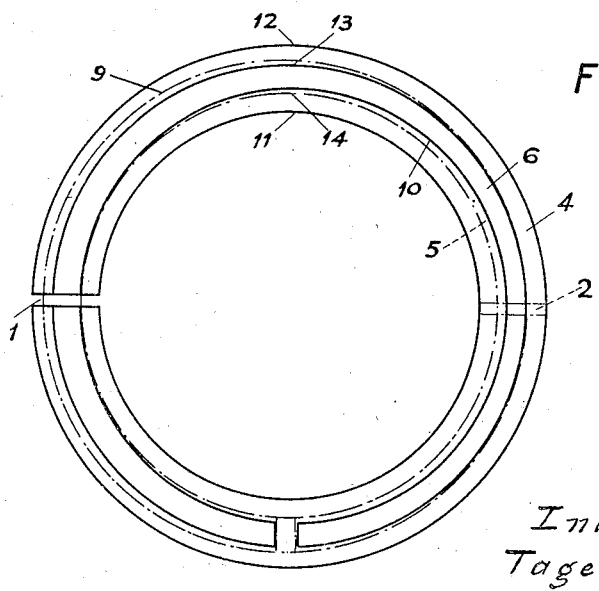
Inventor:
Tage Madsen, Patented Aug. 20, 1929.

1,725,660

UNITED STATES PATENT OFFICE.

TAGE MADSEN, OF GOTTENBORG, SWEDEN.

PACKING RING FOR USE WITH PISTONS AND PISTON RODS.

Application filed January 28, 1928, Serial No. 250,260, and in Great Britain September 28, 1927.

This invention relates to slit packing rings and particularly to composite packing rings which are composed of two or more complete slit rings interengaged by means of flanges and grooves.

Common piston packing rings of the slit type present a rather wide passage at their joints to the pressure gases. When two such rings are put together in the same piston groove with the joints out of register this composite packing ring will offer a greater resistance against the escape of gases.

The object of this invention is to provide for a practical arrangement of such composite rings which will make it possible to profit from the advantages mentioned.

The accompanying drawing shows a few embodiments according to the invention. In the drawing, Fig. 1 is a top view of one of the rings with the other ring shown in dotted lines, Fig. 2 a cross sectional view along line A—B in Fig. 1, Fig. 3 a similar cross sectional view of another embodiment. These figures show packing rings for pistons. Fig. 4 is a top view similar to Fig. 1 showing a packing ring for packing boxes for piston rods and the like.

Referring to the drawing, the piston packing ring in Figs. 1 and 2 consists of two complete rings 3 and 4 which are slit at 1 and 2 respectively and the ring 3 provided with an annular recess or groove 5 and the ring 4 with an annular projection or flange 6. The slits 1 and 2 are out of register and preferably spaced 180° apart and held in this mutual position by means of a cut or recess 7 in the flange 6 and a corresponding stop or pin or shoulder 8 in the groove 5. The groove 5 is excentrically arranged on its ring 3 as also the flange 6 on its ring 4. The important feature is that the groove 5 and the flange 6 are mutually excentric and that the groove 5 is wider than the flange 6. Thereby is to be observed that the ends of one ring do not project outside the circumference of the opposite ring in order to avoid destruction of the piston cylinder which otherwise should occur if the ends of the rings be caught by ports and like openings in the cylinder wall.

This can be attained for instance by making the outer side 9 of the groove 5 and the inner side 10 of the flange 6 coaxial to the inner and outer cylindrical surfaces 11 and 12 respectively of the two rings 3 and 4. The outer side 13 of the flange and the inner side 14 of the groove will on the contrary not be coaxially arranged in relation to each other and to the surfaces 11 and 12 of the rings. Thereby the outer side 9 of the groove 5 presents to the flange 6 at the slit ends of the ring 4 a sliding surface which in each and all mutual positions of the rings 3 and 4 is at the same distance from the circumference of the ring 3. Likewise the inner side 10 of the flange 6 presents to the groove at the slit ends of the ring 3 a sliding surface which in each and all mutual positions of the rings 3 and 4 is at the same distance from the circumference of the ring 4.

For the purpose of simplifying the manufacture of the rings both the rings 3 and 4 can be made equal, as shown in Fig. 3. In this case the flange 6 will be put on or be integral with a separate ring 15 which is loosely inserted in one of the rings 3 or 4 whereby the flange 6 maintains its excentric position as described above.

The invention described can also be applied to packing boxes for piston rods. In such case the rings should of course tend to spring inwardly instead of outwardly. Thus the flange should lie against the opposite side of the groove, viz, the play $x$ in Fig. 2 should appear on the other side of the flange 6, as shown in Fig. 4. In this figure the sides 13 and 14 should be made coaxial to the circumferential surface 11 respectively 12 of the two rings, and the sides 9 and 10 should not be made coaxial in relation to each other and to the circumferential surfaces 11 and 12.

It is not essential that the inner circumference 11 is coaxial to the outer circumference 12 but it is practical to make the rings 3 and 4 of even breadth.

To each one of the rings 3 and 4 can be given a different springing tendency in order to obtain a better working of the rings in the cylinders. Such tendency can be imparted to the rings for instance by hammering the inner side of the rings.

I claim:—

1. In a packing ring composed of several rings interengaged by means of annular flanges and grooves, the groove being wider than the flange and the flange and groove not being coaxially arranged in relation to each other.

2. In a packing ring composed of several rings interengaged by means of annular flanges and grooves, the groove being wider than the flange, the outer side of the groove and the inner side of the flange being coaxial to the circumference of the rings and the outer side of the flange and the inner side of the groove not being coaxial in relation to each other and to the circumference of the rings.

3. In a packing ring composed of several rings interengaged by means of annular flanges and grooves, the groove being wider than the flange, the inner side of the groove and the outer side of the flange being coaxial to the inner cylindrical surface of the rings and the inner side of the flange and the outer side of the groove not being coaxial in relation to each other or to the inner cylindrical surface of the rings.

In witness whereof, I hereunto subscribe my name this 12th day of January, 1928.

TAGE MADSEN.